United States Patent [19]
Welch

[11] Patent Number: 5,750,196
[45] Date of Patent: *May 12, 1998

[54] PROCESS FOR MANUFACTURING DOG CHEW TOYS OF TIRE SIDEWALLS

[75] Inventor: James W. Welch, El Paso, Tex.

[73] Assignee: CB Worldwide Inc., Mammoth Lakes, Calif.

[*] Notice: The term of this patent shall not extend beyond the expiration date of Pat. No. 5,609,913.

[21] Appl. No.: 818,960

[22] Filed: Mar. 14, 1997

Related U.S. Application Data

[63] Continuation-in-part of Ser. No. 631,370, Apr. 12, 1996, Pat. No. 5,609,913.

[51] Int. Cl.⁶ .................. B05D 3/10; B05D 3/12; B05D 7/02
[52] U.S. Cl. .................. 427/290; 119/710; 119/711; 427/322; 427/371; 427/430.1
[58] Field of Search ............... 427/242, 290, 427/322, 299, 413, 430.1, 371; 119/710, 711; 428/903.3; 426/480, 805

[56] References Cited

U.S. PATENT DOCUMENTS

| | | | |
|---|---|---|---|
| 2,069,391 | 2/1937 | Sample | 428/903.3 |
| 2,194,736 | 3/1940 | de Bruler | 119/711 |
| 3,871,334 | 3/1975 | Axelrod | 426/805 |
| 3,949,443 | 4/1976 | Edgar | 15/21 A |
| 4,036,271 | 7/1977 | Presti | 150/54 B |
| 4,145,955 | 3/1979 | Mueller et al. | 90/13.7 |
| 4,157,727 | 6/1979 | McDonough et al. | 157/13 |
| 4,469,817 | 9/1984 | Hayashi et al. | 521/45 |
| 4,557,219 | 12/1985 | Edwards | 119/710 |
| 4,579,871 | 4/1986 | Linden et al. | 521/43 |
| 4,614,752 | 9/1986 | Fuchs et al. | 521/44.5 |
| 4,682,522 | 7/1987 | Barclay | 83/19 |
| 4,873,096 | 10/1989 | Spiel et al. | 426/805 |
| 4,906,488 | 3/1990 | Pera | 426/573 |
| 4,964,655 | 10/1990 | Tucker | 280/851 |
| 5,057,333 | 10/1991 | Lawson | 426/480 |
| 5,097,562 | 3/1992 | Tessier | 15/302 |
| 5,120,767 | 6/1992 | Allard et al. | 521/405 |
| 5,149,550 | 9/1992 | Mohilef | 426/480 |
| 5,263,436 | 11/1993 | Axelrod | 119/710 |
| 5,339,771 | 8/1994 | Axelrod | 119/711 |
| 5,356,939 | 10/1994 | Burrowes et al. | 524/415 |
| 5,369,830 | 12/1994 | Chiarabini Bravi | 12/146 BR |
| 5,397,818 | 3/1995 | Flanigan | 524/68 |
| 5,407,661 | 4/1995 | Simone et al. | 426/805 |

FOREIGN PATENT DOCUMENTS 2083217A 12/1971 France ............ 119/710

*Primary Examiner*—Diana Dudash
*Attorney, Agent, or Firm*—Kelly Bauersfeld Lowry & Kelley, LLP

[57] ABSTRACT

A die is utilized to cut chew toy bases from tire sidewalls extracted from used tires. The chew toy bases are initially soaked in a cleansing solution of bleach and a detergent, and are subsequently cleaned by scrubbing them with a brush and rinsing with water. The chew toy bases are placed on a drying rack, and are then soaked in a conditioning solution of a silicone-based rubber beautifier and a scenting and/or flavoring agent. The chew toy based are then polished and screened utilizing a metal detector to identify if there is any metal within the new toy bases. The chew toy bases are suitable for use as dog chew toys and, depending on the particular design of the chew toy bases, may be assembled to other chew toy bases to manufacture a composite dog chew toy.

26 Claims, 9 Drawing Sheets

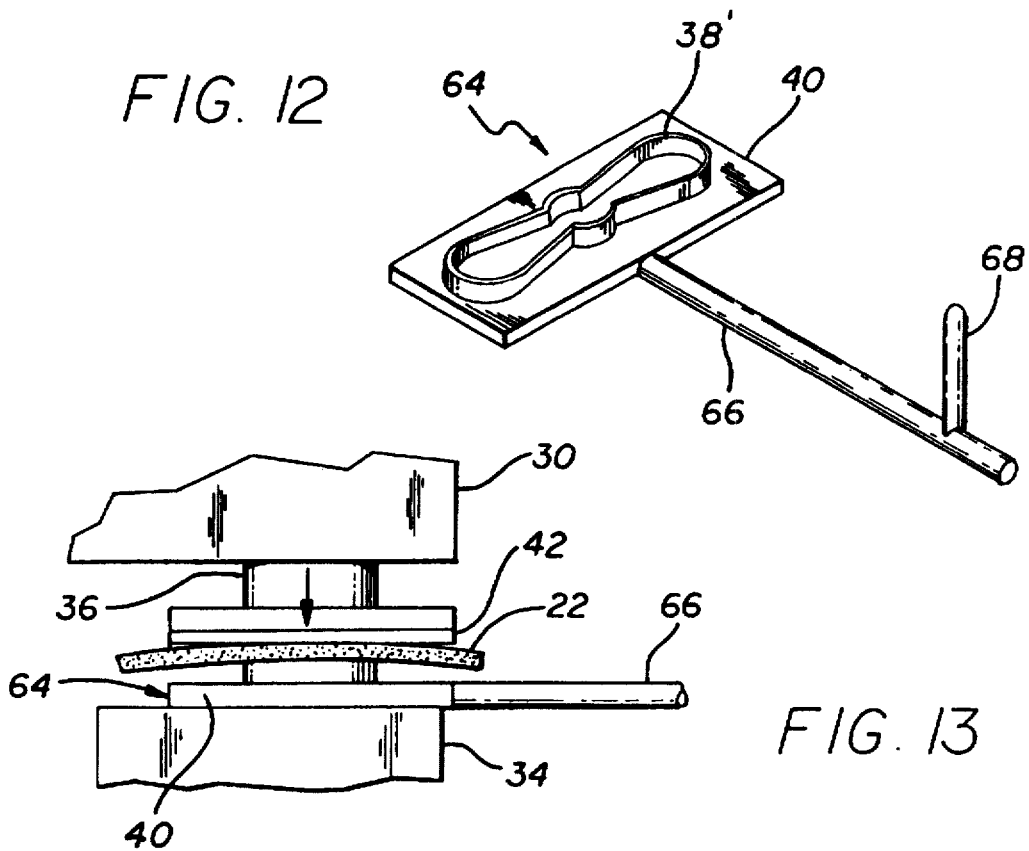
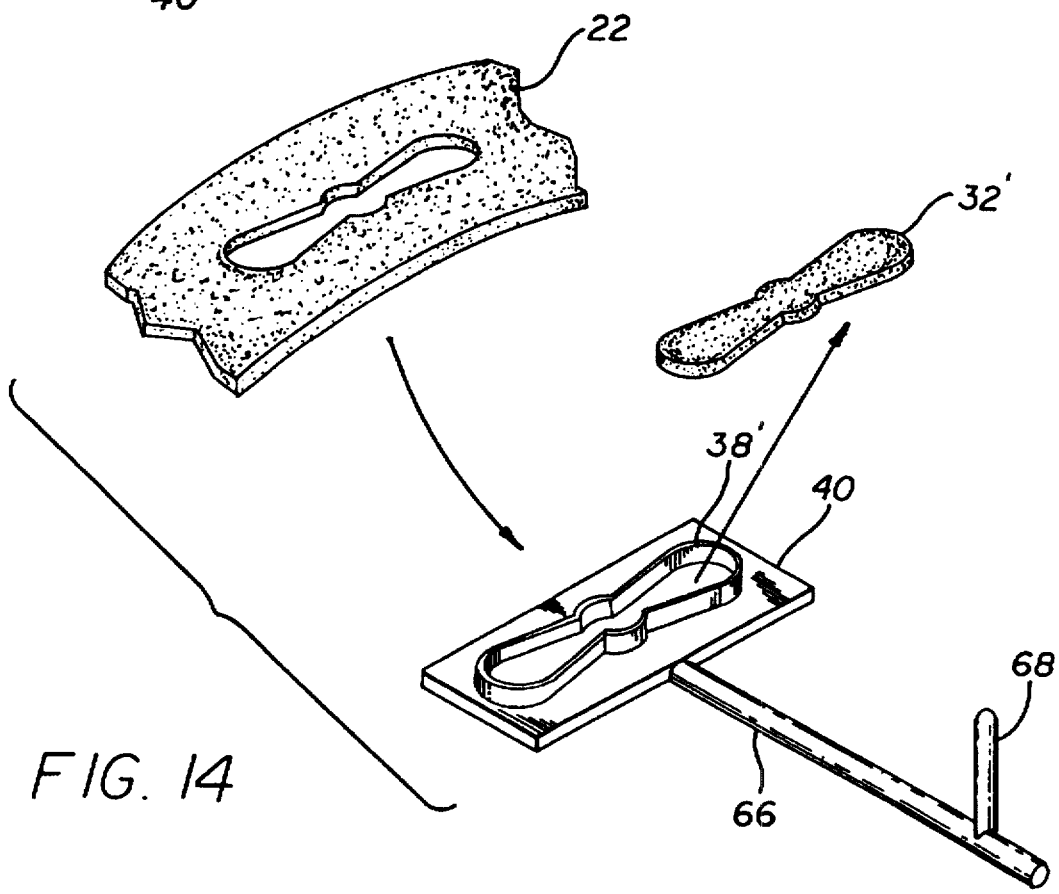

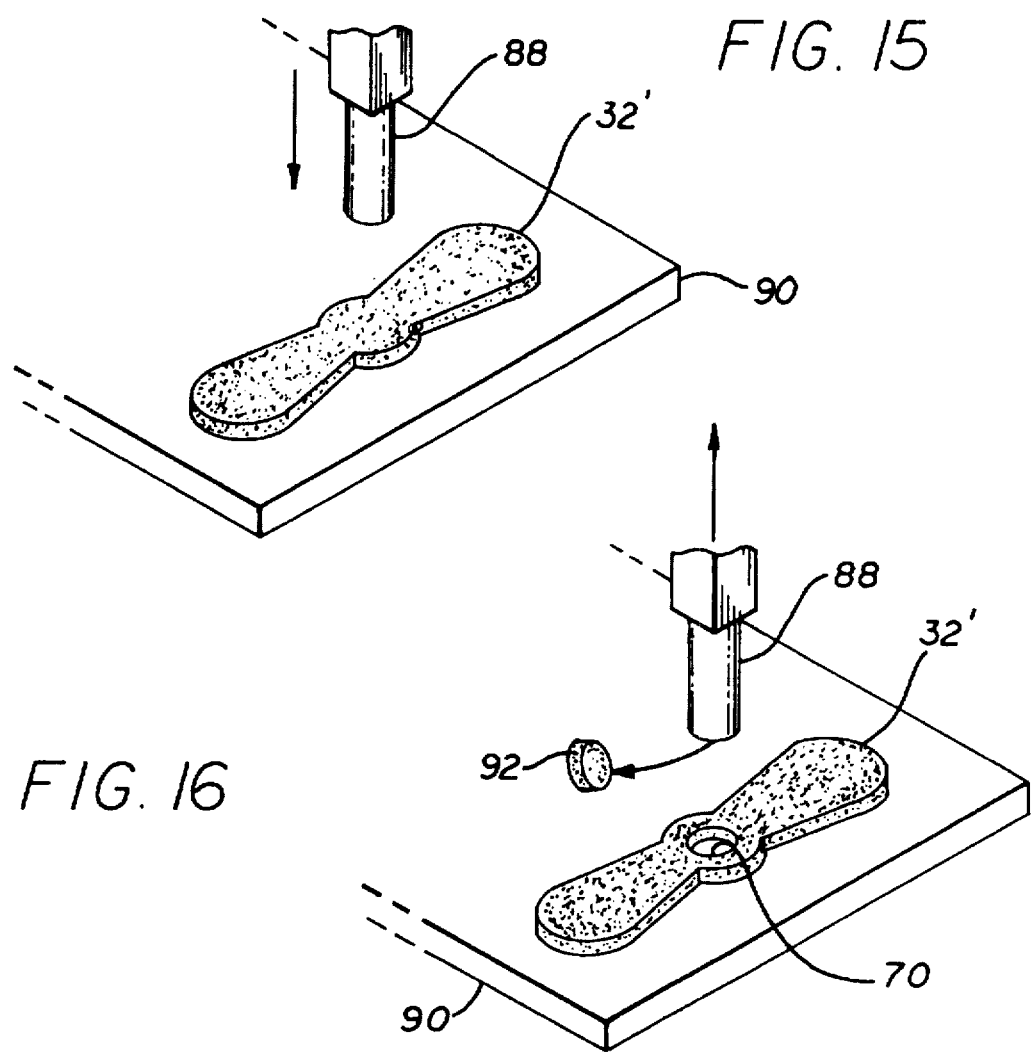
FIG. 15
FIG. 16
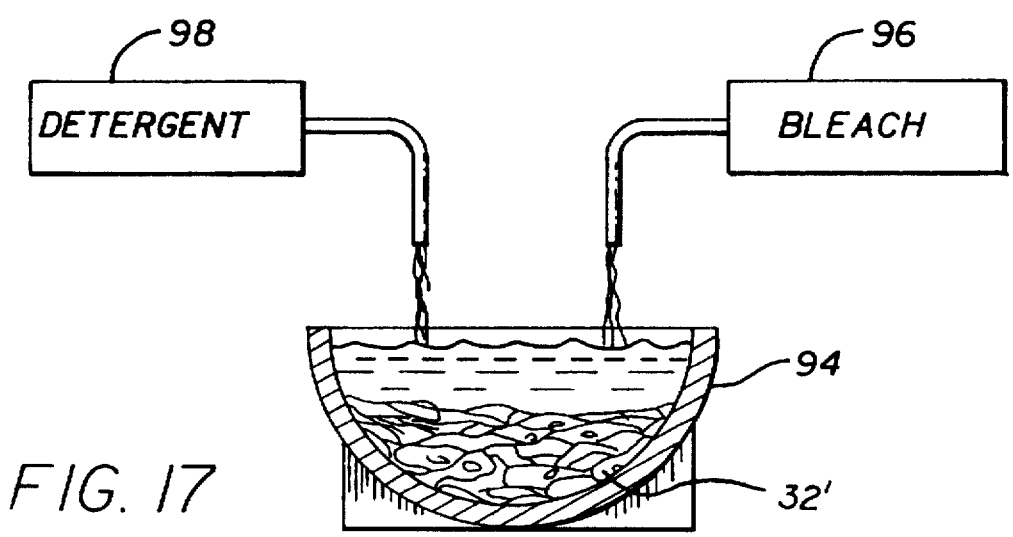
FIG. 17

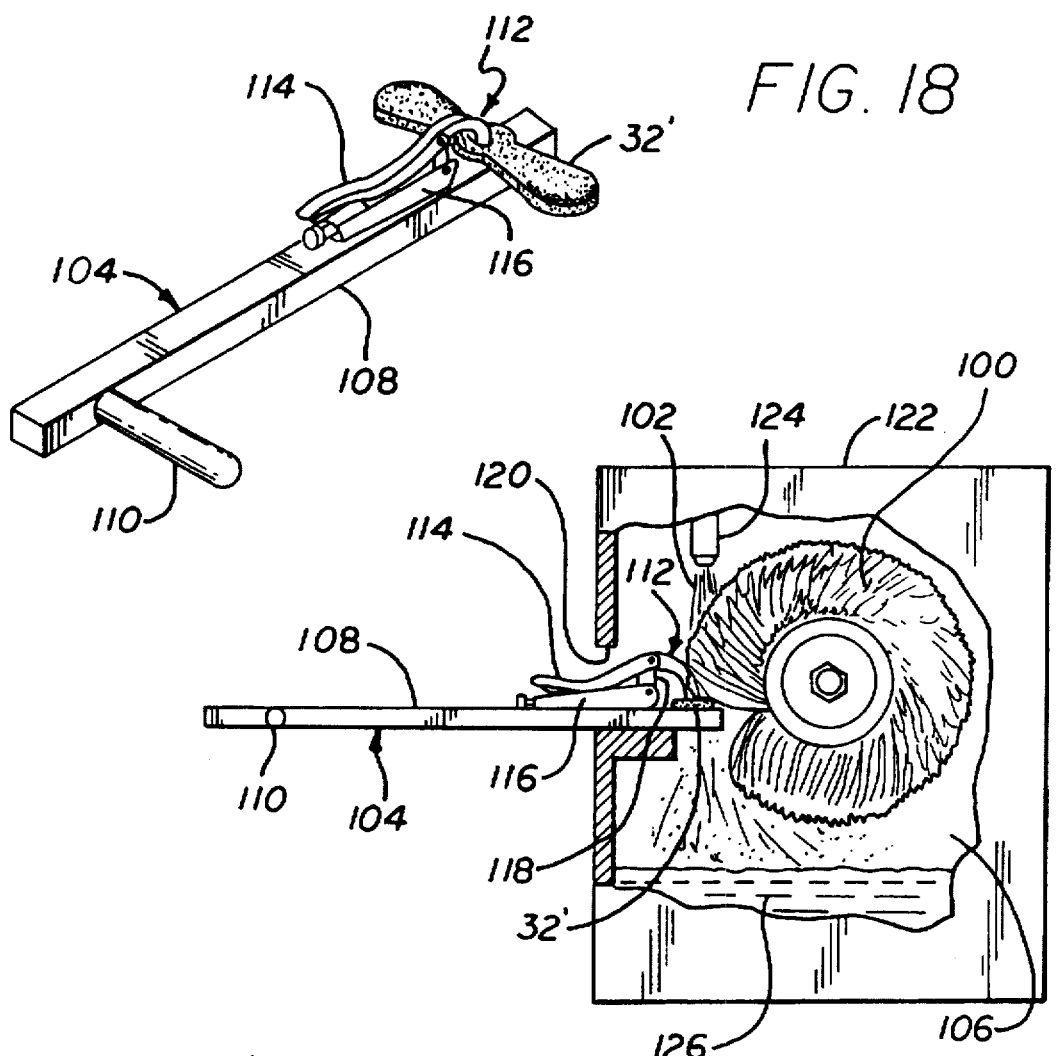
FIG. 18
FIG. 19
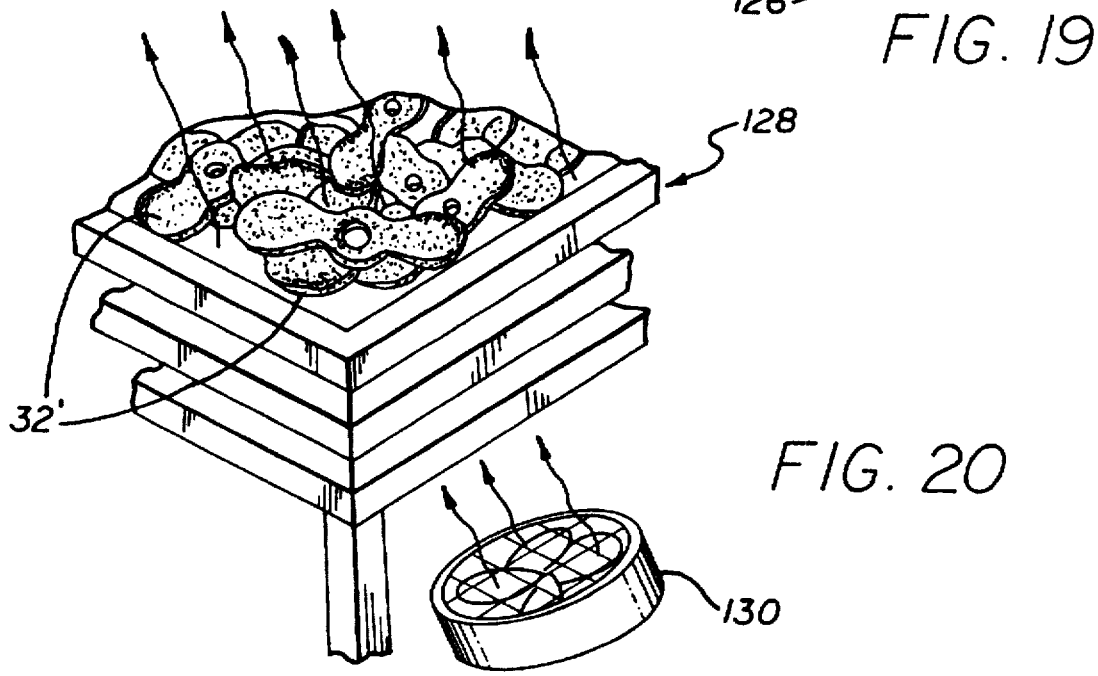
FIG. 20

PROCESS FOR MANUFACTURING DOG CHEW TOYS OF TIRE SIDEWALLS

This is a continuation-in-part of U.S. patent application Ser. No. 08/631,370, filed Apr. 12, 1996, now U.S. Pat. No. 5,609,913, and entitled PROCESS FOR MANUFACTURING DOG CHEW TOYS OF TIRE SIDEWALLS.

BACKGROUND OF THE INVENTION

This invention relates generally to the manufacture of rubber articles. More specifically, the present invention relates to a process for manufacturing dog chew toys of the tire sidewalls of used tires.

The benefits of recycling rubber are well known. Much work has been done to devise methods of recycling rubber through reclaiming and the use of various chemical additives to revulcanize the recycled rubber. See, for example, U.S. Pat. No. 4,579,871 and the discussion of prior rubber reclaiming methods therein. Furthermore, there is produced each year vast quantities of ground cured rubber from operations such as the grinding of used tires and the grinding and buffing of various rubber articles such as transmission belts, conveyer belts and tire carcasses in recapping operations.

The disposal and/or reprocessing of used tires in an environmentally safe manner has proven to be a relatively expensive proposition. There has been a need, therefore, for improved methods for utilizing components of used tires in an environmentally safe manner, which the consumer finds beneficial. In this regard, advantageous use of used tire components to manufacture new articles should require a minimum of processing of the used tire components to create a product pleasing to the senses and functionally viable. A potential market for such products is in the pet care industry.

Accordingly, there has been a need for a novel process for manufacturing useful articles of tire components, which process may be utilized to efficiently manufacture such articles in great quantities at relatively low cost. As there is a need in the pet care industry for dog chew toys, there is a need to develop a process to utilize tire components to manufacture such toys. The present invention fulfills these needs and provides other related advantages.

SUMMARY OF THE INVENTION

The present invention resides in the process for manufacturing dog chew toys of tire sidewalls removed from used tires. The process comprises, generally in regard to a first preferred form of the invention, the steps of cutting a chew toy base from a tire sidewall, and cleaning and polishing the chew toy base within a cleaning tumbler utilizing sand and gravel. Once the chew toy base is removed from the cleaning tumbler, it is rinsed to remove residual sand therefrom, and then placed within a final treatment tumbler to flavor the chew toy base with a flavoring agent. Additionally, the chew toy base may be beautified with a conditioning agent simultaneously with the step of flavoring the chew toy base within the final treatment tumbler.

More specifically, the entire sidewall is cut from a used tire prior to the step of cutting the chew toy base from the tire sidewall. The step of cutting the sidewall from the tire includes the steps of utilizing a stationary knife to effect the cutting while rotating the tire.

Next, the chew toy base is cut from the sidewall into a desired configuration utilizing a die. The die is preferably fit to a press, and then the tire sidewall is placed adjacent to the die which is then activated to cut the chew toy base from the tire sidewall. The chew toy base is removed from the die, the tire sidewall is rotated to place an unused portion adjacent to the die, and then the press is activated to cut another chew toy base. This cutting process continues until substantially the entire sidewall is consumed in creating chew toy bases.

The chew toy bases are placed into a cleaning tumbler containing sand and gravel, and the cleaning tumbler is rotated to clean and polish the chew toy bases. They are then removed from the cleaning tumbler and placed into a rinsing tumbler containing water. The rinsing tumbler is rotated to remove residual sand and dirt from the chew toy bases. Afterwards, the chew toy bases are removed from the rinsing tumbler and placed onto drying racks.

Once dry, the chew toy bases are placed into a final treatment tumbler containing porous media having flavoring and beautifying/conditioning agents applied thereto. The flavoring agents may include salt, animal fat, smoke flavor, and other flavor variations. The preferred beautifying agent is Armor All. The chew toy bases and the porous media are rotated within the final treatment tumbler to bring the chew toy bases into contact with the porous media to effect a transfer of the flavoring agent and the beautifying agent to the chew toy bases.

In regard to a second preferred form of the invention, the process comprises generally the steps of cutting a chew toy base from a tire sidewall and cleaning the chew toy base by scrubbing it with a brush and rinsing it with water. Once cleaned, the chew toy base is then soaked in a conditioning solution containing a rubber beautifier and a scenting agent.

More specifically, like in the previously described process, the entire sidewall is cut from a used tire prior to the step of cutting the chew toy base from the tire sidewall. The step of cutting the sidewall from the tire includes the steps of utilizing a stationary knife to effect the cutting while rotating the tire. However, as it is well understood by those in the art, any suitable process may be utilized to cut the tire sidewall from the tire.

Next, the chew toy base is cut from the sidewall into a desired configuration utilizing a die in the same manner as described above. Either a die/backing plate that is mounted into a press may be utilized, or a hand-held cutting die may be advantageously utilized for lower production volume pieces.

Prior to the scrubbing step, the chew toy base is soaked in a cleansing solution comprising bleach and a detergent. After being subsequently scrubbed and rinsed, the chew toy base is placed on a drying rack prior to being placed within the conditioning solution. The conditioning solution comprises a silicone-based rubber beautifier and means for scenting the chew toy base.

Next, the chew toy base is polished and, if necessary, at least a portion of an exterior surface of the chew to base may be removed utilizing a grinder. The prepared chew toy base is then screened utilizing a metal detector to identify if there is any metal within the chew toy base.

It is sometimes desirable to manufacture chew toy bases having different configurations that may be assembled to one another to form a composite dog chew toy. In such cases it is often desirable to punch additional apertures within the chew toy base subsequent to the step of utilizing a die to cut the chew toy base into a desired configuration. Such apertures may be created within the previously cut chew toy base using an arbor press.

The resulting product is a dog chew toy of a quality that may be sold on the retail market. The dog chew toys may be easily shipped in bulk packaging without degrading the quality thereof.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompany drawings illustrate the invention. In such drawings:

FIGS. 12–29 illustrate a second preferred process in accordance with the present invention, wherein:

FIG. 12 is a perspective view of a hand-held cutting die utilized to cut chew toy bases from the tire sidewalls;

FIG. 13 is a fragmented front elevational view of a mechanical punch press similar to that shown in FIG. 4, illustrating use of the hand-held cutting die of FIG. 12 therein;

FIG. 14 is a partially fragmented, exploded perspective view of the hand-held cutting die of FIG. 12, a portion of a tire sidewall having an aperture therein defining the shape of a chew toy base cut therefrom, and the cut chew toy base;

FIG. 15 is a perspective view of the chew toy base cut from the tire sidewall illustrated in FIG. 14 (in the shape of an airplane propeller) placed on a stationary base and aligned with a manual arbor press;

FIG. 16 is a perspective view similar to FIG. 15, illustrating use of the arbor press to punch an aperture through the chew toy base;

FIG. 17 illustrates the step of soaking the cut chew toy bases within a container of cleansing solution comprising bleach and a detergent;

FIG. 18 is a perspective of a yoke on which a chew toy base is placed prior to scrubbing the chew toy base with a brush;

FIG. 19 illustrates the step of cleaning the chew toy base by scrubbing it with a brush and rinsing it with water within a closed container;

FIG. 20 illustrates the step of drying the cleaned chew toy bases on a rack;

FIG. 21 illustrates the step of soaking the dried chew toy bases in a conditioning solution that beautifies, scents and/or flavors the rubber of the chew toy bases;

FIG. 22 illustrates the step of polishing the chew toy bases;

FIG. 23 illustrates the step of utilizing a grinder to shave a dirty exterior layer of white wall off the polished chew toy base;

FIG. 24 illustrates the step of screening a chew toy base utilizing a highly sensitive metal detector;

FIG. 25 illustrates the assembly of one type of chew toy base to another using a vise-type system which holds a part without an insertion hole (airplane wing) while another part with the insertion hole (airplane body) is pulled onto the wing;

FIG. 26 illustrates three exemplary chew toy bases that may be assembled to one another to form a composite structure;

FIG. 27 illustrates the assembled composite structure of the parts shown in FIG. 26 (an airplane);

FIG. 28 illustrates three different chew toy bases that may be assembled together to form a composite structure; and FIG. 29 illustrates an assembled composite structure of the parts shown in FIG. 28 (a dinosaur).

DETAILED DESCRIPTION OF THE PREFERRED EMBODIMENTS

Figure 1:
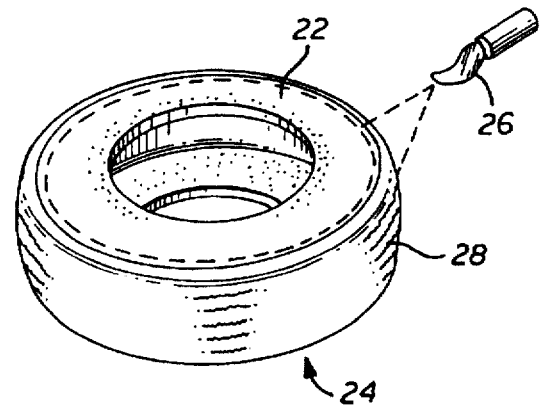
FIG. 1 is a perspective view of a used tire and a hand-held knife, illustrating one method of cutting tire sidewalls from the used tire.
Figure 2:
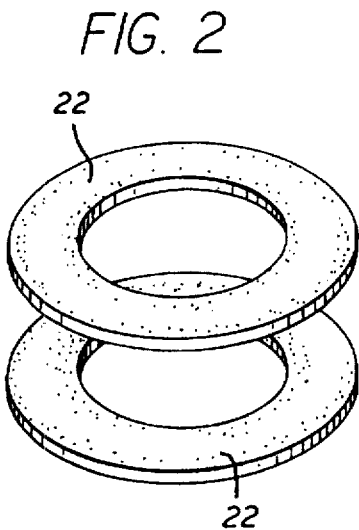
FIG. 2 is a perspective view of two tire sidewalls cut from the used tire shown in FIG. 1.

As shown in the drawings for purposes of illustration, the present invention is concerned with a novel process for manufacturing dog chew toys (generally designated in FIG. 11 by the reference number 20) from the sidewalls 22 of used tires 24 (see FIGS. 1 and 2).

In accordance with the present invention and with reference initially to FIGS. 1 and 2, the process involves obtaining used tires 24 from tire scrap yards, tire shops and other locations where used tires are accumulated. A tire sidewall 22 is extracted from the used tire 24 by use of a hand held knife 26 or by means of a knife positioned on a rotating arm pivoting at a center point. The purpose is to separate the tire sidewall 22 from the tire tread 28. Two tire sidewalls 22 may be extracted from one tire 24 (FIG. 2).

Figure 3:
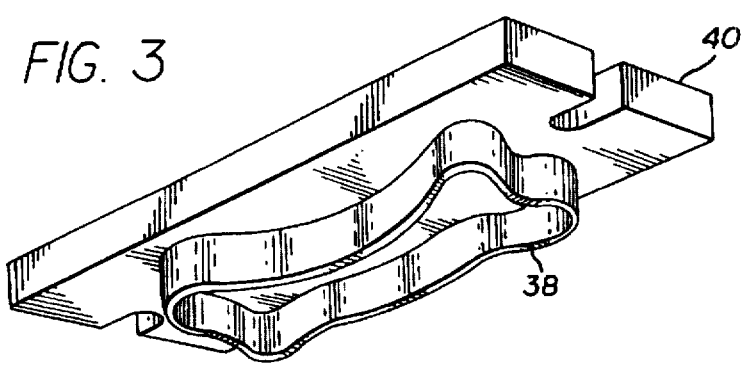
FIG. 3 is a perspective view of a cutting die on a backing plate utilized to cut chew toy bases from the tire sidewalls in accordance with the process of the present invention.
Figure 5:
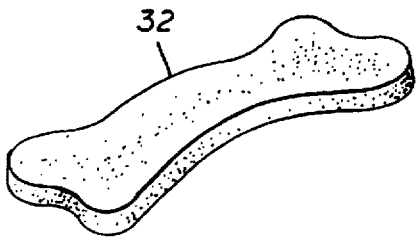
FIG. 5 is a perspective view of a chew toy base cut from the tire sidewall utilizing the cutting die of FIG. 3.
Figure 4:
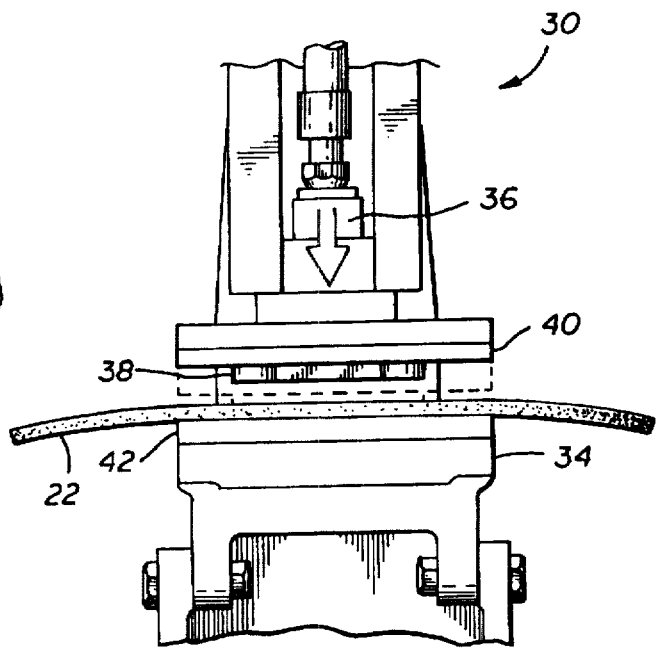
FIG. 4 is a front elevational view of a mechanical punch press having the cutting die and backing plate mounted to an upper moving portion of a press plate, and further illustrating the positioning of a tire sidewall over a lower stationary platform and adjacent to the cutting die.

With reference to FIGS. 3–5, the tire sidewall 22 is then placed in either a mechanical punch press 30 or a similar die cut press such as a hydraulic clicker press. In this regard, mechanical punch presses are ideal for die cutting chew toy bases 32 (FIG. 5) since they have a fast cycle, low maintenance, low cost for used presses, and are easily obtainable. Such presses 30 typically are manufactured to have a vertical stroke whereby the material to be cut is placed on a lower stationary platform 34. An upper moving portion 36 of the punch press 30 is fitted with a die 38 attached to a backing plate 40 (FIG. 3). The lower stationary platform 34 is fitted with a hard plastic punch base 42 which is designed to provide a solid cutting surface while not damaging the cutting die 38. The plastic punch base 42 is preferably fabricated with vacuum holes and a vacuum apparatus (not shown). The vacuum plate will remove the cut chew toy bases 32 out of the cutting die 38 so that the cut sidewall 22 can be easily removed from the punch press 30.

The cutting die 38 is preferably made of hardened steel rule material. The steel rule is bent to form a desired shape. Exemplary shapes include the bone shape illustrated, airplanes, throw balls, ball and chains, fire hydrants, letters and numbers. The steel rule is available in both straight edge (as shown) and serrated edge. The serrated edge offers better cutting performance. The cutting die 38 is then mounted on the backing plate 40 which gives the cutting die rigidity for added cutting performance and die longevity.

With the tire sidewall 22 placed over the lower stationary platform 34 directly over the plastic punch base 42 as shown in FIG. 4, the mechanical punch press 30 is activated to displace the die 38 downwardly (as illustrated in phantom) to cut a chew toy base 32 from the tire sidewall. The cut chew toy base 32 is then removed from the die 38 and the plastic punch base 42. The remaining unused tire sidewall 22 is rotated to where an unused portion of the tire sidewall is under the die 38. The press 38 is again activated, and the entire process is repeated until substantially the entire sidewall 22 is consumed in creating chew toy bases 32.

Figure 6:
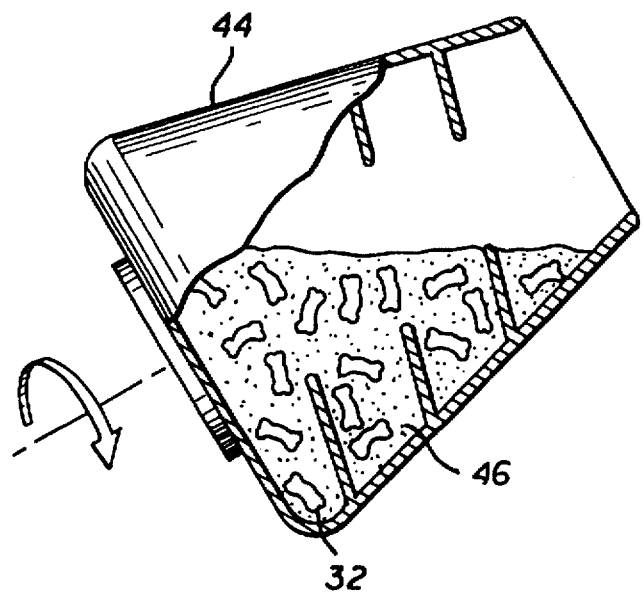
FIG. 6 is an elevational and partially sectional view illustrating a plurality of chew toy bases within a cleaning tumbler filled with sand and gravel which is rotated for purposes of cleaning and polishing the chew toy bases.

The chew toy bases 32 are then placed into a first or cleaning tumbler 44 which contains cleaning sand and gravel 46 (FIG. 6). The cleaning tumbler 44, which is similar to a concrete mixer, is rotated to tumble the cut chew toy bases 32, and the cleaning sand and gravel removes dirt and grime from the surfaces of the chew toy bases. The tumbling action also polishes the rubber.

Figure 7:
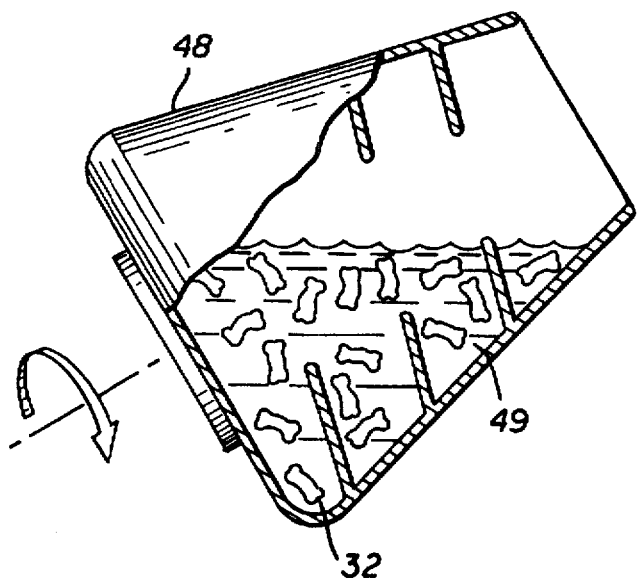
FIG. 7 is an elevational and partially sectional view of a rinsing tumbler into which the chew toy bases removed from the cleaning tumbler of FIG. 6 are placed with water for purposes of removing residual sand and dirt therefrom.

Next, the cleaned and polished chew toy bases 32 are placed into a second or rinsing tumbler 48 which contains water 49 (FIG. 7). As the rinsing tumbler 48 is rotated, residual sand and dirt are removed from the surfaces of the chew toy bases.

Figure 8:
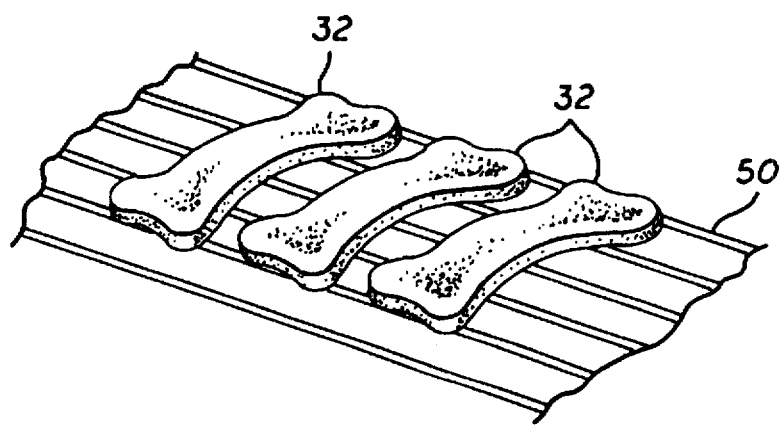
FIG. 8 illustrates the step of removing the chew toy bases from the rinsing tumbler of FIG. 7 and placing them on a drying rack.

The chew toy bases 32 are removed from the rinsing tumbler 48 and placed on a drying rack 50 (FIG. 8).

Figure 9:
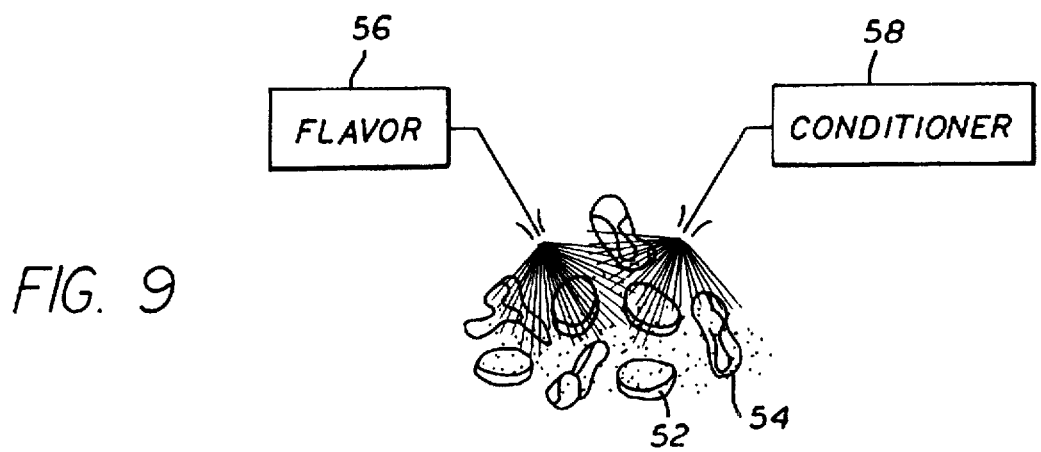
FIG. 9 illustrates the step of applying a flavoring agent and a conditioning agent (rubber beautifier) to porous media such as cloths and sponges.
Figure 10:
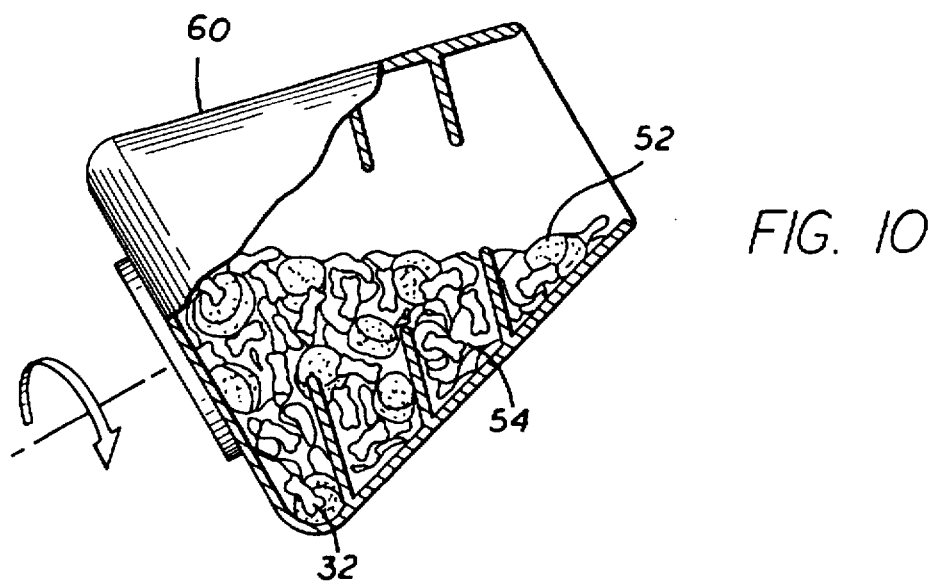
FIG. 10 is an elevational and partially sectional view of a final treatment tumbler into which the dried chew toy bases are placed with the saturated porous media for purposes of flavoring and beautifying the chew toy bases.

As shown in FIGS. 9 and 10, porous media such as sponges 52 and cloths 54 are sprayed with a flavoring agent (i.e., salt, animal fat, smoke flavor, or other flavor variations and scents) 56 and a conditioning or rubber beautifying agent (Armor All) 58 prior to being placed within a third or final treatment tumbler 60. The dried chew toy bases 32 are removed from the drying rack 50 and placed into the final treatment tumbler 60 with the porous media having the flavoring and beautifying/conditioning agents 56 and 58 applied thereto, and the final treatment tumbler 60 is rotated to bring the chew toy bases 32 into contact with the porous media 52 and 54 to effect a transfer of the flavoring agent 56 and the beautifying agent 58 to the chew toy bases 32. The porous media (sponges 52 and cloths 54) are preferably saturated with the flavoring agent 56 and the beautifying agent 58 prior to being placed within the final treatment tumbler 60.

Figure 11:
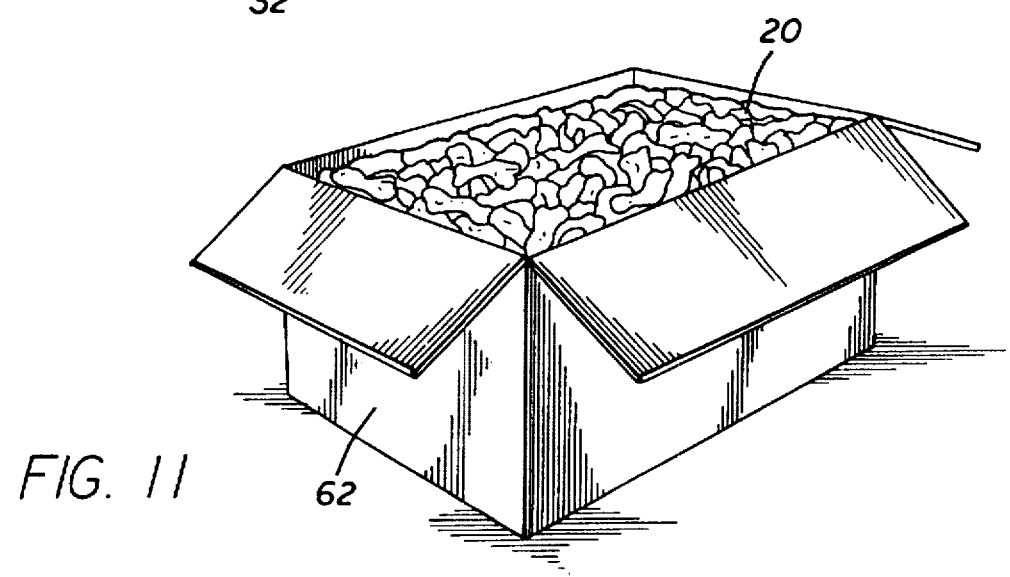
FIG. 11 illustrates the resultant dog chew toys removed from the tumbler of FIG. 10 and separated from the porous media, and then packaged in bulk packaging prior to shipment.

The beautified and flavored chew toy bases 32, when removed from the final treatment tumbler 60, are now suitable for sale as dog chew toys 20. They are then quality inspected, touched up if required, and placed in packaging 62 for shipment (FIG. 11).

FIGS. 12–29 illustrate another preferred process for manufacturing dog chew toys of tire sidewalls. In so far as possible, the same reference numbers utilized in connection with the foregoing description will be maintained. It will be appreciated that aspects of the second preferred process to be described below may be utilized in connection with the first preferred form of the invention described above, and vice versa.

FIGS. 12–14 illustrate a second die system that may be utilized to cut chew toy bases 32' from a cut tire sidewall 22. The second die system comprises a hand-held cutting die 64 that includes a die 38' attached to a backing plate 40, and a rod 66 that extends from the backing plate. A handle 68 extends perpendicularly from the rod 66 to facilitate manually placing the backing plate-supported die 38' into a mechanical punch press 30.

The cutting die 38' is, once again, preferably made of hardened steel rule material. The steel rule is bent to form a desired shape (illustrated in the shape of an airplane propeller). The steel rule is available in both straight edge (as shown) and serrated edge. The serrated edge offers better cutting performance. The cutting die 38' is then mounted on the backing plate 40 which gives the cutting die rigidity for added cutting performance and die longevity.

As illustrated in FIG. 13, the hand-held cutting die 64 is placed within the mechanical punch press 30 so that the backing plate 40 is placed directly over the lower stationary platform 34. The cut tire sidewall 22 is then placed over the die 38' prior to activating the press. When utilizing the hand-held cutting die 64, the hard plastic punch base 42 is fitted to the upper moving portion 36 of the punch press 30. Thus, when the mechanical punch press 30 is activated to displace the plastic punch base 42 downwardly, the upwardly facing die 38' causes a chew toy base 32' to be cut from the tire sidewall 22. The die 38' may then be removed from the punch press 30 and the stamped part (the chew toy base 32') may be removed from the die. Hand-held dies 64 are less expensive and are appropriate for lower production volume pieces.

Figure 26:
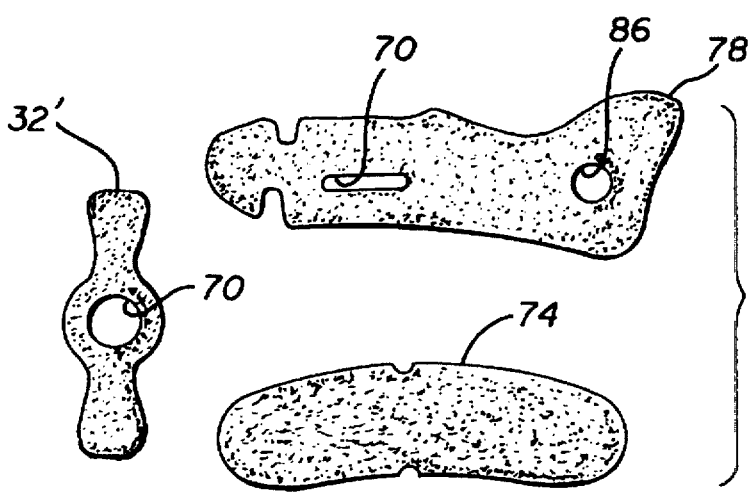
Figure 27:
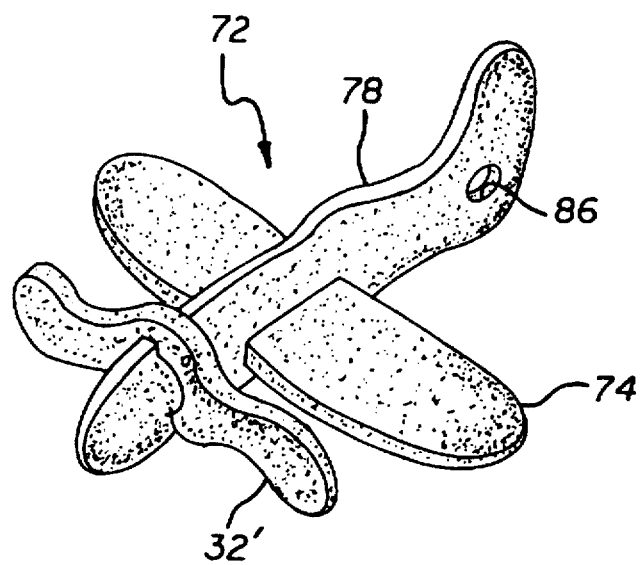

Referring to FIGS. 15, 16 and 26–29, some chew toy bases 32' require insertion apertures 70. By way of example, FIG. 26 illustrates three different chew toy bases that may be separately stamped from a cut tire sidewall 22 and then processed (either separately or together) and assembled to form a composite airplane-like dog chew toy 72. In particular, the airplane toy 72 may be assembled of the propeller chew toy base 32', an airplane wing base 74 and an airplane body base 76. The insertion apertures 70 in the propeller base 32' and the airplane body 76 permit the various components of the airplane toy 72 to be assembled to one another as shown, generally, in FIG. 25.

Figure 28:
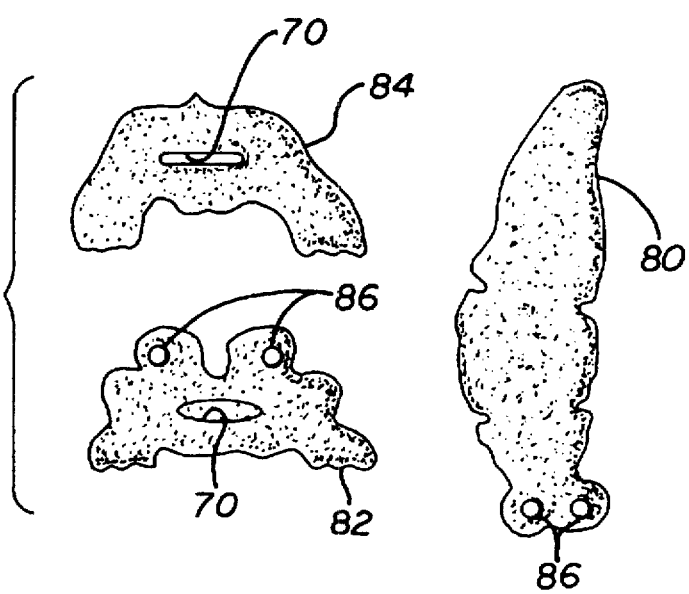
Figure 29:
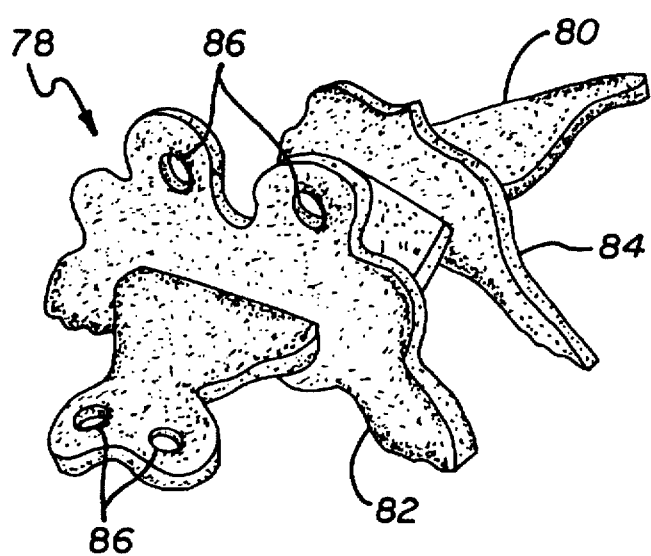

By way of further example, the composite dog chew toy that may be manufactured utilizing the processes of the present invention may take other forms, as illustrated in FIGS. 28 and 29. There a composite dog chew toy in the form of a dinosaur 78 is shown. The dinosaur toy 78 is manufactured of three separate chew toy bases, namely a body portion 80, a front leg portion 82 and a rear leg portion 84. Insertion apertures are provided in both the front and rear leg portions 82 and 84 to permit those portions to be assembled to the body portion 80. Additional apertures 86 may be provided for aesthetic purposes.

The insertion apertures 70 and the additional apertures 86 may be formed by simply punching the chew toy bases 32 utilizing a manual arbor press 88. As shown in FIGS. 15 and 16, the chew toy base 32' is placed on a supporting base 90, the arbor press 88 is aligned with the area to be stamped and then simply driven through the underlying portion of the chew toy base 32'. The removed portion 92 of the chew toy base 32' is discarded following the procedure.

After the chew toy bases 32' have been cut from the tire sidewalls 22 and modified, if necessary, by cutting additional apertures 70 or 86, they are placed into a container 94 of bleach 96 and a detergent 98 and soaked for several house (FIG. 17). After soaking, the chew toy bases 32' are cleaned utilizing a cleaning brush 100 and by rinsing them with water 102. More specifically, with reference to FIGS. 18 and 19, the chew toy base 32' is placed on a yoke 104 and then inserted into a cleaning chamber 106. The yoke 104 comprises a rod 108 having a handle 110 at one end and a clamp 112 at another. The clamp 112, which includes a pivoting handle 114, a stationary handle 116 and a linkage 118, is designed to securely hold the chew toy base 32' on the yoke 104 during the brushing and rinsing procedure. After the chew toy base 32' has been properly mounted onto the yoke 104, the portion of the yoke supporting the chew toy base 32' is inserted through an aperture 120 of an enclosure 122 that defines the cleaning chamber 106. The chew toy base 32' is brought into contact with a rotating polishing/cleaning brush 100 that serves to scrub, as it rotates, the exterior surfaces of the chew toy base 32'. A water conduit 124 extends through the enclosure 122 to provide a spay of water 102 directly onto the brush chew toy base 32'. The enclosure 122 serves as a water reservoir 126 and, if desired, the water within the reservoir 126 may be recycled.

Once cleaned, the chew toy base 32' is removed from the yoke 104 and placed on a drying rack 128. The drying rack 128 may have multiple levels and be provided with an air blower 130 to facilitate drying of the previously cleaned chew toy bases 32' (FIG. 20).

Figure 21:
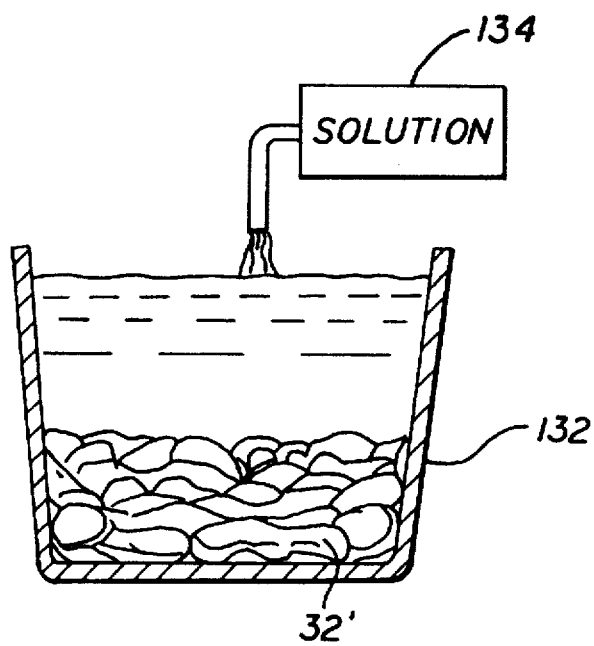

The cleaned and dried chew toy bases 32' are then placed into a container 132 filled with a solution 134 for conditioning the chew toy bases. The solution 134 preferably contains a conditioning or rubber beautifying agent such as Armor All or another similar silicone based rubber conditioning and/or beautifying agent and/or a flavoring and/or scenting agent (i.e., salt, animal fat, smoke flavor, liquid smoke, or other flavor variations and scents) (FIG. 21). The solution 134 conditions the rubber of the cleaned chew toy bases 32' by beautifying, scenting and/or flavoring the bases 32'.

Figure 22:
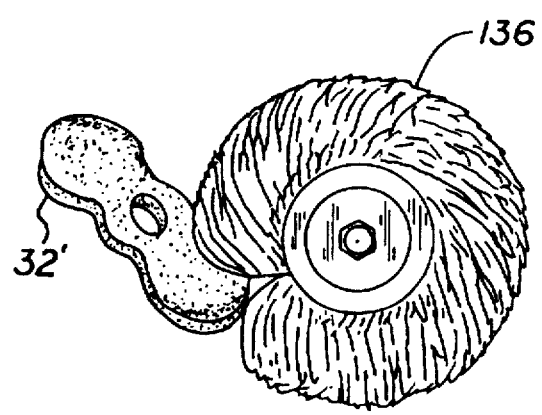
Figure 23:
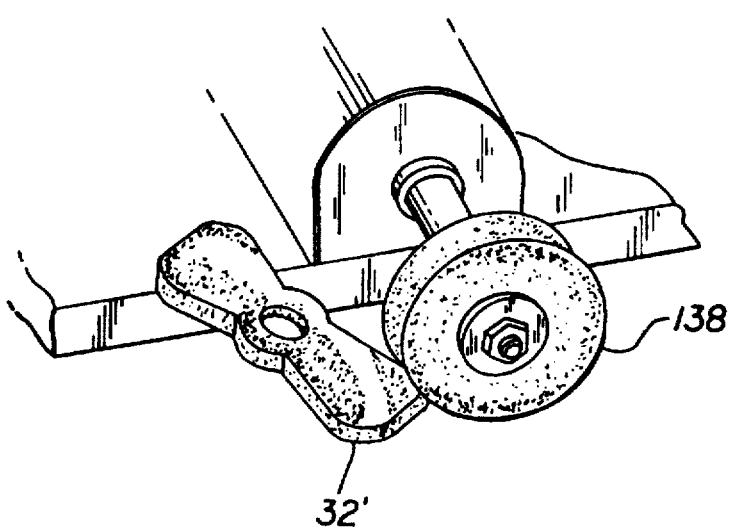

After the chew toy bases 32' have been allowed to soak in the conditioning solution 134, they are subsequently polished utilizing a polishing brush 136 (FIG. 22). For some parts that have dirty white sidewalls after the initial cleaning process, a grinder 138 may be utilized to shave the dirty exterior layer sidewall off the chew toy base 32'. This grinding process produces a clean fresh layer of whitewall (FIG. 23).

Figure 24:
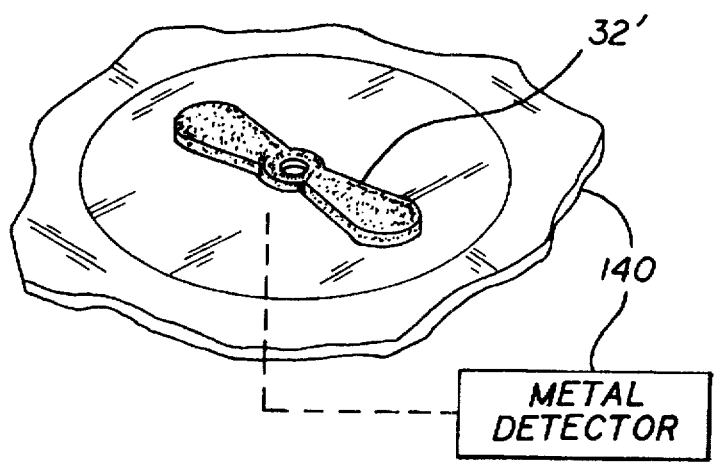
Figure 25:
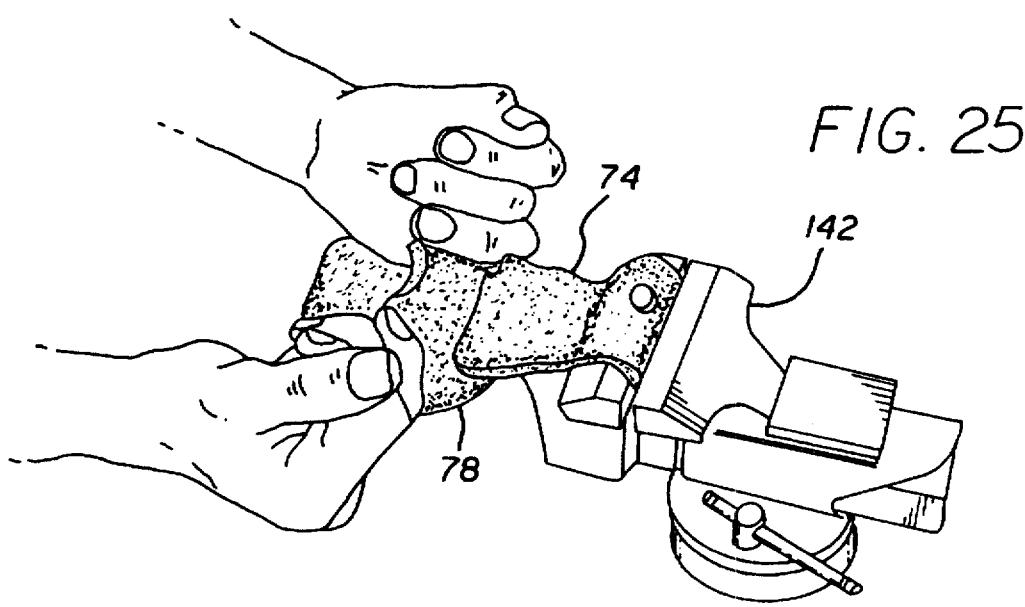

The processed chew toy base 32' is next screened using a highly sensitive metal detector 140 (such as the Goldmaster metal detector by Whites Electronics) to identify if there is any metal in the base 32' (FIG. 24).

For composite or multiple part dog chew toys, such as the airplane toy 72 and the dinosaur toy 78, the component parts are assembled utilizing a bench-mounted vise 142 that holds a part without the insertion aperture (for example, the airplane wing 74), while the other part with an insertion aperture 70 (the airplane body 76) is pulled onto the wing.

The cleansed, conditioned and, if desired, assembled chew toy bases are now suitable for sale as dog chew toys 20. Once they are quality inspected and touched up if required, they are placed in packaging 62 for shipment (FIG. 11).

From the foregoing it will be appreciated that the process set forth herein for manufacturing dog chew toys of tire sidewalls, provides a means for economically utilizing used tires to fashion a commercially useful product. The process is easy to implement and utilizes abundantly available materials and tools.

Although two particular embodiments of the invention have been described in detail for purposes of illustration, various modifications of each may be made without departing from the spirit and scope of the invention. Accordingly, the invention is not to be limited, except as by the appended claims.

I claim:

1. A process for manufacturing dog chew toys of tire sidewalls, comprising the steps of:

cutting a chew toy base from a tire sidewall;

cleaning the chew toy base by scrubbing it with a brush and rinsing it with water; and soaking the chew toy base in a conditioning solution.

2. The process of claim 1, including the step of cutting the entire sidewall from the tire prior to the step of cutting the chew toy base from the tire sidewall.

3. The process of claim 2, wherein the step of cutting the sidewall from the tire includes the steps of utilizing a pivoting knife to effect the cutting while holding the tire stationary.

4. The process of claim 1, wherein the cutting step includes the step of utilizing a die to cut the chew toy base into a desired configuration.

5. The process of claim 4, including the step of punching an aperture within the chew toy base.

6. The process of claim 4, wherein the cutting step includes the further steps of fitting the die to a press, placing the tire sidewall adjacent to the die, and activating the press to cut the chew toy base from the tire sidewall.

7. The process of claim 6, further including the steps of removing the chew toy base from the die, rotating the tire sidewall to place an unused portion adjacent to the die, and activating the press to cut another chew toy base, and continuing the cutting process until substantially the entire sidewall is consumed in creating chew toy bases.

8. The process of claim 1, including the step of soaking the chew toy base in a cleansing solution prior to the scrubbing step.

9. The process of claim 8, wherein the cleansing solution comprises bleach and a detergent.

10. The process of claim 1, including the step of drying the chew toy base subsequent to the cleaning step and prior to the soaking step.

11. The process of claim 1, wherein the conditioning solution comprises a rubber beautifier and means for scenting the chew toy base.

12. The process of claim 1, including the step of polishing the chew toy base subsequent to the soaking step.

13. The process of claim 12, including the step of grinding at least a portion of an exterior surface of the chew toy base.

14. The process of claim 1, including the step of screening the chew toy base utilizing a metal detector to identify if there is any metal within the chew toy base.

15. The process of claim 1, including the step of assembling the chew toy base to another chew toy base to manufacture a composite dog chew toy.

16. A process for manufacturing dog chew toys of tire sidewalls, comprising the steps of:

cutting a chew toy base from a tire sidewall;

soaking the chew toy base in a cleansing solution;

cleaning the chew toy base;

drying the chew toy base; and soaking the chew toy base in a conditioning solution.

17. The process of claim 16, wherein the cleaning step includes the steps of scrubbing the chew toy base with a brush and rinsing it with water.

18. The process of claim 16, wherein the cleansing solution comprises bleach and a detergent.

19. The process of claim 16, wherein the conditioning solution comprises a rubber beautifier and means for scenting the chew toy base.

20. The process of claim 16, including the step of polishing the chew toy base subsequent to the soaking step.

21. The process of claim 16, including the step of screening the chew toy base utilizing a metal detector to identify if there is any metal within the chew toy base.

22. A process for manufacturing dog chew toys of tire sidewalls, comprising the steps of:

cutting a chew toy base from a tire sidewall;

soaking the chew toy base in a cleansing solution comprising bleach and a detergent;

cleaning the chew toy base by scrubbing it with a brush and rinsing it with water;

drying the chew toy base;

soaking the chew base in a conditioning solution comprising a rubber beautifier and a scenting and/or flavoring agent; and polishing the chew toy base.

23. The process of claim 22, including the step of screening the chew toy base utilizing a metal detector to identify if there is any metal within the chew toy base.

24. The process of claim 22, including the step of grinding at least a portion of an exterior surface of the chew toy base.

25. The process of claim 22, wherein the cutting step includes the further steps of fitting the die to a press, placing the tire sidewall adjacent to the die, and activating the press to cut the chew toy base from the tire sidewall.

26. The process of claim 25, further including the steps of removing the chew toy base from the die, rotating the tire sidewall to place an unused portion adjacent to the die, and activating the press to cut another chew toy base, and continuing the cutting process until substantially the entire sidewall is consumed in creating chew toy bases.

\* \* \* \* \*